(12) United States Patent
Lee et al.

(10) Patent No.: US 9,798,656 B2
(45) Date of Patent: Oct. 24, 2017

(54) MEMORY CONTROLLER, METHOD OF OPERATING, AND APPARATUS INCLUDING SAME

(71) Applicant: SAMSUNG ELECTRONICS CO., LTD., Suwon-si, Gyeonggi-do (KR)

(72) Inventors: Won Chul Lee, Yongin-si (KR); Moo Sung Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 655 days.

(21) Appl. No.: 14/309,952

(22) Filed: Jun. 20, 2014

(65) Prior Publication Data

US 2015/0006792 A1   Jan. 1, 2015

(30) Foreign Application Priority Data

Jun. 28, 2013 (KR) ........................ 10-2013-0075394

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/065* (2013.01); *G06F 3/0679* (2013.01); *G06F 2003/0697* (2013.01); *G06F 2212/7205* (2013.01); *G06F 2212/7211* (2013.01)

(58) Field of Classification Search
CPC ........................... G06F 12/0246; G06F 3/0679
USPC ........................................................ 711/103
See application file for complete search history.

(56) References Cited

U.S. PATENT DOCUMENTS

| 6,570,785 | B1 | 5/2003 | Mangan et al. |
| 7,453,728 | B2 | 11/2008 | Noguchi et al. |
| 7,751,238 | B2 | 7/2010 | Seol |
| 7,818,525 | B1* | 10/2010 | Frost ............... G06F 12/0246 |
| | | | 365/185.25 |
| 7,885,112 | B2 | 2/2011 | Li et al. |
| 8,159,882 | B2 | 4/2012 | Honma et al. |
| 8,190,842 | B2 | 5/2012 | Frost et al. |
| 8,281,220 | B2 | 10/2012 | Kitahara |
| 8,316,278 | B2 | 11/2012 | Ahn et al. |
| 8,804,418 | B1* | 8/2014 | Shih ............... G11C 16/10 |
| | | | 365/185.02 |
| 2009/0193174 | A1* | 7/2009 | Reid ............... G06F 12/0246 |
| | | | 711/100 |
| 2011/0038203 | A1* | 2/2011 | Camp ............ G11C 16/3418 |
| | | | 365/185.02 |

(Continued)

FOREIGN PATENT DOCUMENTS

| JP | 2009037317 | 2/2009 |
| JP | 2010129038 | 6/2010 |

*Primary Examiner* — Prasith Thammavong
(74) *Attorney, Agent, or Firm* — Volentine & Whitt, PLLC

(57) ABSTRACT

A method of operating a memory controller includes; counting a number of read operations directed to a page-group of data stored in a block and generating a first read count number, then comparing the first read count number with a first reference count threshold among a first set of reference count thresholds associated with the page-group, and upon determining that the first read count number exceeds the first reference count threshold, performing a copy-back operation of the page-group data from the block to another block.

16 Claims, 14 Drawing Sheets

(56) References Cited

U.S. PATENT DOCUMENTS

| | | | |
|---|---|---|---|
| 2011/0055458 A1* | 3/2011 | Kuehne | G06F 12/0246 |
| | | | 711/103 |
| 2011/0214033 A1 | 9/2011 | Yoshii et al. | |
| 2013/0262749 A1* | 10/2013 | Oikawa | G06F 11/004 |
| | | | 711/103 |
| 2013/0311705 A1* | 11/2013 | Cheng | G06F 12/0246 |
| | | | 711/103 |

* cited by examiner

FIG. 8

| P/E CYCLE<br>PAGE GROUP | 0 ~ 100 | 101 ~ 500 | 500 ~ 3000 |
|---|---|---|---|
| PAGE-GROUP1 | RC1-1 | RC1-2 | RC1-3 |
| PAGE-GROUP2 | RC2-1 | RC2-2 | RC2-3 |

MEMORY CONTROLLER, METHOD OF OPERATING, AND APPARATUS INCLUDING SAME

CROSS-REFERENCE TO RELATED APPLICATIONS

This application claims priority under 35 U.S.C. §119(a) from Korean Patent Application No. 10-2013-0075394 filed on Jun. 28, 2013, the subject matter of which is hereby incorporated by reference.

BACKGROUND

The inventive concept relates generally to memory controllers, methods of operating memory controllers, and apparatuses incorporating memory controllers. More particularly, the inventive concept relates to memory controller operating methods capable of copying back page-group data from one memory block to another memory block during a read refresh operation.

Flash memory devices include a vast number of individual memory cells that operate under various conditions related to both the memory cells themselves and the flash memory device as a whole. For example, it is well understood that each flash memory cell will gradually 'fatigue' (or wear-out) over its operational life. Additionally, the quality (or reliability) of the data stored by a memory cell at any given point in time will be affected by certain eternal (e.g., noise, environmental, and/or operating voltage-related) factors. That is, the actual threshold voltage exhibited by a programmed flash memory cell relative to a set of defined threshold voltage distributions is a function of many factors. Accordingly, memory system designers seek to account for these many factors in order to provide data having the highest data reliability that may be reasonably expected for a memory device, given its age, use, and overall functionality.

SUMMARY

According to an aspect of the inventive concept, there is provided a method of operating a memory controller comprising; counting a first number of read operations directed to a first page-group of data stored in a first block of the memory device to generate a first read count number, and counting a second number of read operations directed to a second page-group of data stored in the first block of the memory device to generate a second read count number, comparing the first read count number with a first reference count threshold among a first set of reference count thresholds associated with the first page-group and upon determining that the first read count number exceeds the first reference count threshold, performing a copy-back operation of the first page-group data from the first block to a second block of the memory device different from the first block.

According to another aspect of the inventive concept, there is provided a memory controller for controlling a memory device and comprising; a counting module that generates a first read count number for a first page-group of data stored in a first block of a flash memory device, and a second count number for a second page-group of data stored in the first block of the memory device to generate a second read count number, and a copy-back page-group determination module that compares the first read count number with a first reference count threshold among a first set of reference count thresholds associated with the first page-group, and upon determining that the first read count number exceeds the first reference count threshold, performs a copy-back operation of the first page-group data from the first block to a second block of the flash memory device different from the first block.

BRIEF DESCRIPTION OF THE DRAWINGS

These and/or other aspects and advantages of the inventive concept will become more apparent to those skilled in the art upon consideration of the following written description of the embodiments taken in conjunction with the accompanying drawings of which:

FIG. 8 is a read refresh table illustrating conditions that may be used during a copy-back operation according to certain embodiments of the inventive concept;

DETAILED DESCRIPTION OF EMBODIMENTS

Figure 1:
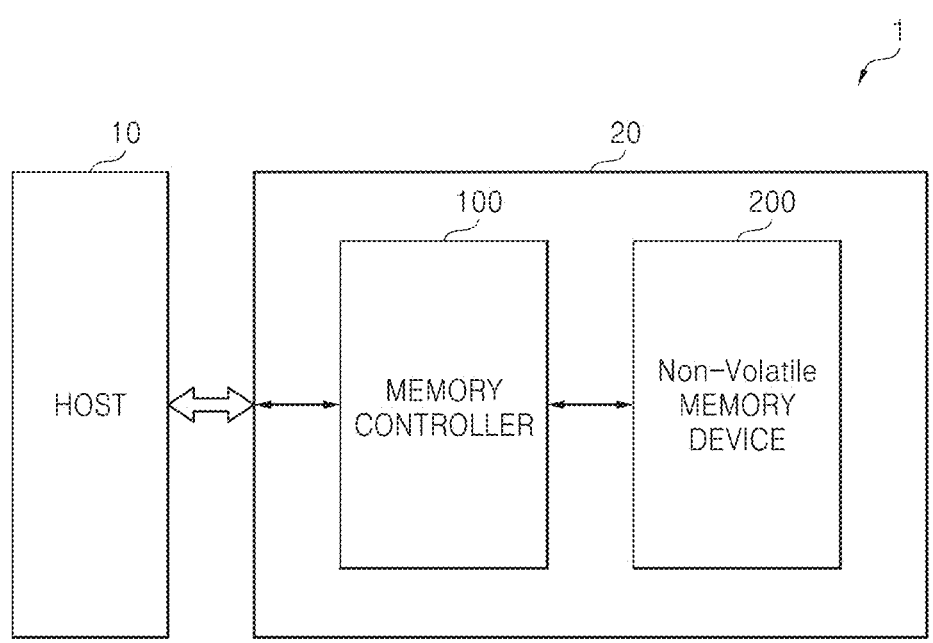
FIG. 1 is a block diagram illustrating an electronic system according to an embodiment of the inventive concept.

Certain embodiments of the inventive concepts will now be described in some additional detail with reference to the accompanying drawings. This inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and levels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "module" is used hereafter to denote a variety of related hardware, firmware and/or software components that cooperate to provide certain functionality to memory controllers and apparatuses according to embodiments of the inventive concept. Those skilled in the art will recognize that many different specific configurations of software, firmware and/or hardware may be provide equivalent functionality. Thus, the term "module" may read on, in part, one or more logical unit(s); programming code; and/or hardware resource(s) that when interoperated are capable of performing the described functionality.

Figure 2:
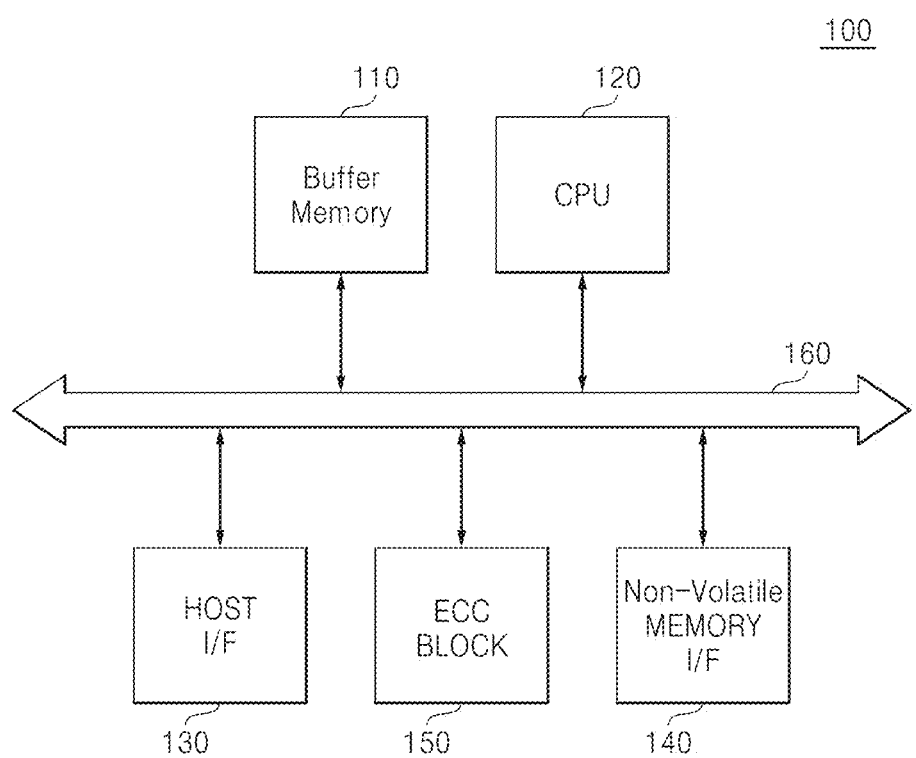
FIG. 2 is a block diagram further illustrating the memory controller 100 of FIG. 1.

FIG. 1 is a block diagram illustrating an electronic system 1 according to an embodiment of the inventive concept, and FIG. 2 is a block diagram further illustrating the memory controller 100 of FIG. 1. Referring to FIG. 1, the electronic system 1 generally includes a host 10 and a memory system 20.

The memory system 20 is connected with the host 10 and includes the memory controller 100 and a non-volatile memory device 200. The memory controller 100 may control data exchange between the host 10 and the non-volatile memory device 200. In certain embodiments, the memory controller 100 may be used to control the execution of read operations directed to "read data" stored in the non-volatile memory device 200 and/or write operations related to "write data" to be written to the non-volatile memory device 200 in response to a request received from the host 10.

In addition to controlling the execution of read/write operations, the memory controller 100 may also be used to monitor and control certain "internal operations" that contribute to the successful overall operation of the non-volatile memory device 200. Such internal operations (e.g., garbage collection, wear-levelling, read refresh, etc.) may be thought of as housekeeping, background, or management operations that are necessary to the proper and efficient operation of the non-volatile memory device 200. In this context, it is assumed that consistent with conventional usages, the non-volatile memory device 200 may be used to store various types of data, such as data defining programming code as well as payload (e.g., user-defined files) data.

According to various embodiments of the inventive concept, the non-volatile memory device 200 may be implemented using one or more flash memory device(s), an embedded multimedia card (eMMC), a universal flash storage (UFS), a solid state drive (SSD), or a redundant array of independent disks (or a redundant array of inexpensive disks) (RAID). Alternately, according to other embodiments of the inventive concept, the non-volatile memory device 200 may be implemented using one or more non-volatile memory-based storage device(s) other than flash memory-based storage device(s). Examples of the non-volatile memory-based storage device include electrically erasable programmable read-only memory (EEPROM), magnetic RAM (MRAM), spin-transfer torque (MRAM), conductive bridging RAM (CBRAM), ferroelectric RAM (FeRAM), phase change RAM (PRAM), resistive RAM (RRAM), nanotube RRAM (RRAM), polymer RAM (PoRAM), nano floating gate memory (NFGM), holographic memory, molecular electronics memory device, and insulator resistance change memory.

Those skilled in the art will understand that various embodiments of the inventive concept such as memory system 20 may further include components such as a read only memory (ROM) capable of storing programming code executed when the memory system 20 is powered-up, a clock module capable of generating one or more clock signal(s), and/or a timer.

Referring to FIG. 2, the memory controller 100 may include a buffer memory 110, a central processing unit (CPU) 120, a host interface 130, a non-volatile memory interface 140, an error correction code (ECC) block 150, and a bus 160. The buffer memory 110 may be implemented by using volatile memory, such as a static random access memory (SRAM) or a dynamic random access memory (DRAM).

The buffer memory 110 may be used to temporarily store write data to be written to the non-volatile memory device 200 and/or read data retrieved from the non-volatile memory device 200. In the illustrated embodiment of FIG. 2, the buffer memory 110 is internally implemented within the memory controller 100, but this need not be the case in other embodiments.

The CPU 120 may be used to control the overall operation of the memory controller 100. That is, the CPU 120 may be used to control data exchange(s) between the buffer memory 110, the host interface 130, the non-volatile memory interface 140, and the ECC block 150 via the bus 160. The CPU 120 may also be used to drive the execution of a flash translation layer (FTL) associated with the non-volatile memory device 200.

The host interface 130 may be used to control the communication of data and/or information with the host 10 using one or more interface protocol(s), such as an UHS (e.g., UHS-I or UHS-II), a peripheral component interconnect-express (PCI-E), an advanced technology attachment (ATA), a serial ATA (SATA), a parallel ATA (PATA), a serial attached SCSI (SAS), or the like. In certain embodiments of the inventive concept, the interface protocol may be a universal serial bus (USB), a multi-media card (MMC), an enhanced small disk interface (ESDI), or integrated drive electronics (IDE), but is not limited thereto.

In similar manner, the non-volatile memory interface 140 may be used to interface data exchanges between the non-volatile memory device 200 and the memory controller 100. The ECC block 150 may detect and correct an error included in data that is to be stored in the non-volatile memory device 200 or in data read from the non-volatile memory device 200, by using an ECC.

Figure 3:
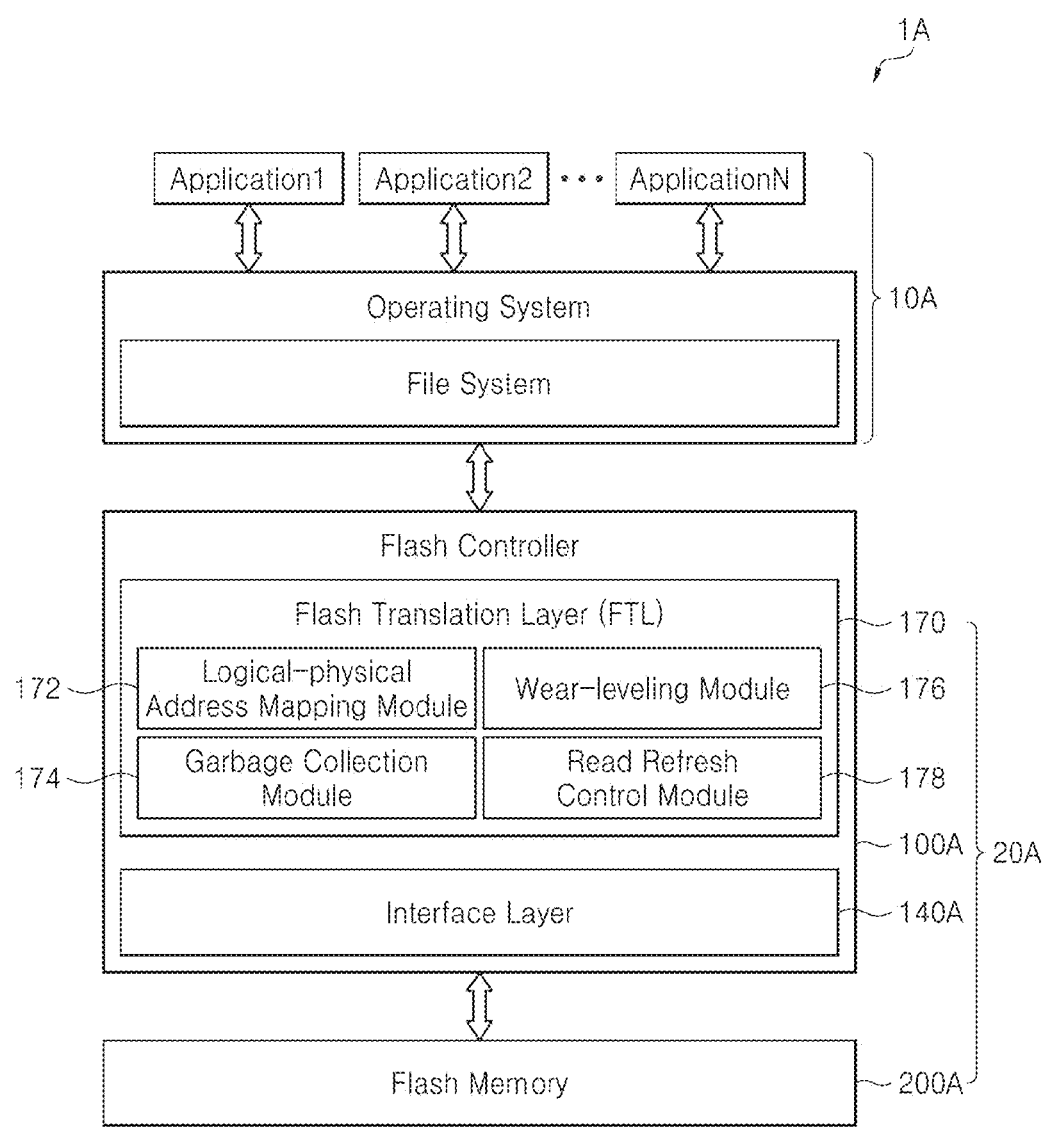
FIG. 3 is a conceptual diagram illustrating an exemplary structure of certain hardware/software components of the electronic system of FIG. 1.

FIG. 3 is a conceptual diagram of an exemplary, hierarchical structure of hardware/software components that may form in one embodiment (1A) the electronic system of FIG. 1. Referring to FIGS. 1, 2 and 3, the electronic system 1A generally comprises a host 10A and a memory system 20A.

The host 10A is assumed to operate in response to one or more operating system(s) (OS) and one or more applications (e.g., application 1 through application N) that make use of certain resources and capabilities provided by the host OS. The memory system 20A is assumed to include a flash controller 100A and a flash memory device 200A. The flash controller 100A is further assumed to include an FTL 170 and an interface layer 140A.

The interface layer 140A provides a flash interface so that the flash controller 100A may access the flash memory device 200A. The interface layer 140A may correspond to the whole or a part of the non-volatile memory interface 140 of FIG. 2.

The FTL 170 is a specialized software layer capable of managing at least the allocation of physical memory space within the memory device 200A. The FTL 170 is functionally disposed between the host 10A and the interface layer 140A so that the flash memory device 200A may be used without an additional requirement of modifying the file system used by the flash memory device 200A to match the file system used by the host 10A.

In its functional operation, the FTL 170 of FIG. 3 is assumed to include a logical-to-physical address mapping module 172, a garbage collection module 174, a wear-levelling module 176, and a read refresh control module 178. The logical-to-physical address mapping module 172, garbage collection module 174, wear-levelling module 176, and read refresh control module 178 may be variously provided either functionally or logically, and may share one or more common hardware/software resources.

The logical-to-physical address mapping module 172 may be used to map certain logical address(es) defined by the file system of the host 10A onto the physical address(es) provided by the flash memory device 200A using, for example, one or more address mapping table(s).

The garbage collection module 174 may be used to control execution of a garbage collection operation that manages the provision of valid page(s) within defined block (s) of the flash memory device 200A. In certain embodiments, the garbage collection operation may copy a valid page existing in an "old block" of the flash memory device 200A to a "new block", and then erase the old block to generate a new "free block" that may be used during subsequent read/write operations.

The wear-levelling module 176 may be used to control the execution of a wear-levelling operation capable of extending the useful lifespan of flash memory cells in the flash memory device 200A. In certain embodiments, the wear-levelling operation manages the distribution of write (or program) operations and/or erase operations across a number of defined memory blocks in order to prevent uneven wearing of the constituent flash memory cells.

The read refresh control module 178 may be used to control the flash memory device 200A in order to copy-back data from an "impaired memory block" having diminished data reliability due to read disturbance experienced by the flash memory device 200A to a "normal memory block" having acceptable data reliability. This type of specialized copy-back operation is termed "a read refresh operation" in the context of the inventive concept.

The term "read disturbance" should be broadly understood to denote an electrical disturbance or interference effect upon a first memory cell connected to a word line that is generated as the result of a read operation being directed to a second memory cell connected to an adjacent word line. The read disturbance may essentially cause an inadvertent (re-)programming of the first memory cell.

In the context of certain embodiments of the inventive concept, the read refresh control module 178 will perform a read refresh operation (i.e., the specialized copy-back operation) according to "page-groups" of data. That is, a particular read refresh operation may be directed to identified "page-group data", wherein the page-group data includes data from two or more pages.

Exemplary structure, operation and/or functionality for the read refresh control module 178 of FIG. 3 will be further described in the context of embodiments illustrated in FIGS. 4, 5, 6, 7, 8 and 9 that follow.

Figure 4:
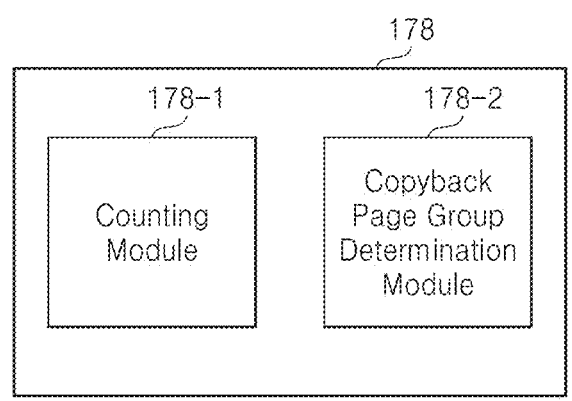
FIG. 4 is a block diagram further illustrating the read refresh control module of FIG. 3.
Figure 5:
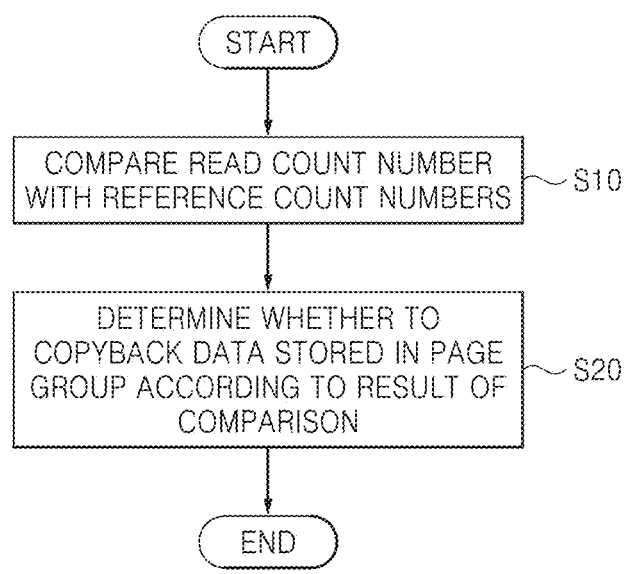
FIG. 5 is a general flowchart summarizing one method of operating a memory controller according to an embodiment of inventive concept.

FIG. 4 is a general block diagram of the read refresh control module 178 of FIG. 3, and FIG. 5 is a flowchart summarizing in one example a method of operating a memory controller according to certain embodiments of the inventive concept. Referring to FIGS. 3, 4 and 5, the read refresh control module 178 comprises a counting module 178-1 and a copy-back page-group determination module 178-2.

The counting module 178-1 may be used to track a "read count number" for each memory block of the flash memory device 200A. That is, the counting module 178-1 will count for each block a number of executed read operations directed to constituent memory cells of each block. The counting module 178-1 may then be used to communicate a particular read count number, or a plurality of read count numbers to the copy-back page-group determination module 178-2. This communication of one or more read count numbers may be done in response to request made to the counting module 178-1, or as part of a cyclically performed update function.

This control information provided by embodiments of the inventive concept recognizes that each defined page-group included in each block of a non-volatile memory will have at any given time a particular data reliability expectation, and that different page-groups will have different data reliability expectations. Further, the data reliability expectation for each page-group will be a function of read disturbance(s) that may have occurred over a given time horizon. The concept of variable data reliability expectations for different page-groups will be described hereafter in relation to FIGS. 6 and 7.

Thus, according to certain embodiments of the inventive concept, the copy-back page-group determination module 178-2 may include a storage device (e.g., memory or register) capable of storing a field of read count numbers that respectively serve as a criterion for a read refresh operation directed to a corresponding page-group. For example, the field of read count numbers may be stored in the storage device in the form of a read refresh table that tracks different read count numbers for each page-group. One possible embodiment for the read refresh table is illustrated in FIG. 8.

Referring to FIG. 5, it is assumed that the copy-back page-group determination module 178-2 compares one or more read count number(s) provided by the counting module 178-1 with each one of a plurality of reference count numbers (S10). Here, each reference count number may be determined in accordance with the page-groups included in a given memory block, and in accordance with a number (or a range) of program/erase (P/E) cycle executed by the flash memory device 200A over a given time period. Thus, as shown for example in FIG. 8, a plurality of reference count numbers may be respectively associated with a plurality of page-groups included in a memory block in accordance with a plurality of P/E cycle ranges for the flash memory device 200A.

Then, the copy-back page-group determination module 178-2 may control the flash memory device 200A to execute a copy-back operation directed to data in a page-group when the page-group has a current read count number that exceeds a relevant reference count number (S20). In other words, the copy-back page-group determination module 178-2 may control the execution of a copy-back operation that copies the data of a page-group from a first block determined to have impaired data reliability to a second block deemed to have normal data reliability.

Figure 6:
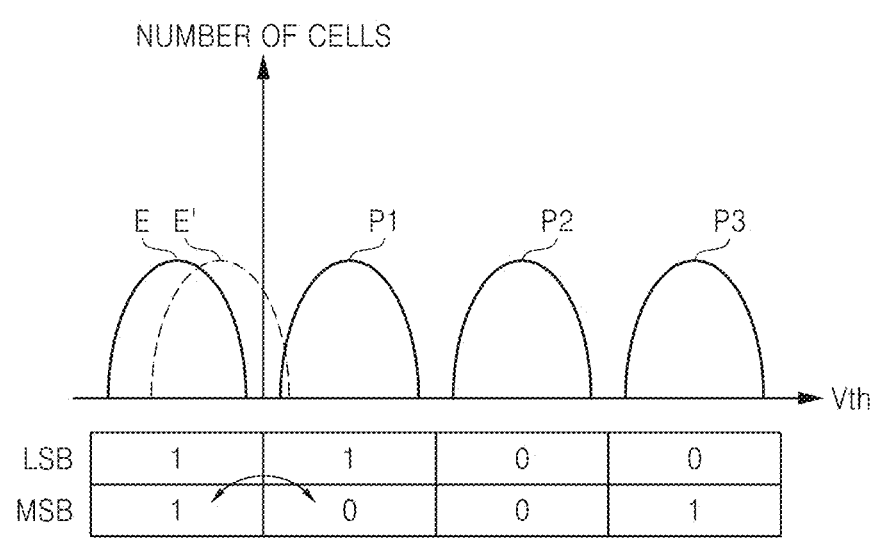
FIGS. 6 and 7 are respective conceptual diagrams that describe reliability differences between different page-groups related to read disturbance.

FIG. 6 is a conceptual diagram further describing a data reliability expectation difference between page-groups that may be caused by read disturbance. Referring to FIG. 6, possible threshold voltage distributions for a 2-bit multi-level flash memory cell (MLC) are shown. Possible states for the MLC include an erase state E and three (3) program states P1, P2 and P3, wherein it is assumed that states E, P1, P2 and P3 respectively correspond to data values of '11', '10', '00', and '01'. In this example, the first bit of each data value is the least significant bit (LSB) and the second bit is the most significant bit (MSB).

As illustrated in FIG. 6, it is assumed that the lowest threshold voltage distribution corresponding to the erase state E is relatively more affected by read disturbance than the program states P1, P2 and P3. Thus, the desired or intended threshold voltage distribution for the erase state E may actually be more like erase state E' due to the read disturbance. Under these assumed conditions, the data reliability expectation for MSB data is relatively low, as it will be difficult to distinguish the erase state E' from the first program state P1. Thus, the data reliability expectation of the LSB page—assuming that the LSB is stored differently from the MSB page—will be different from the data reliability expectation for the MSB page. In other words, a MSB page-group storing the MSB page of the 2-bit MLC will have a lower data reliability expectation than a corresponding LSB page-group.

Figure 7:
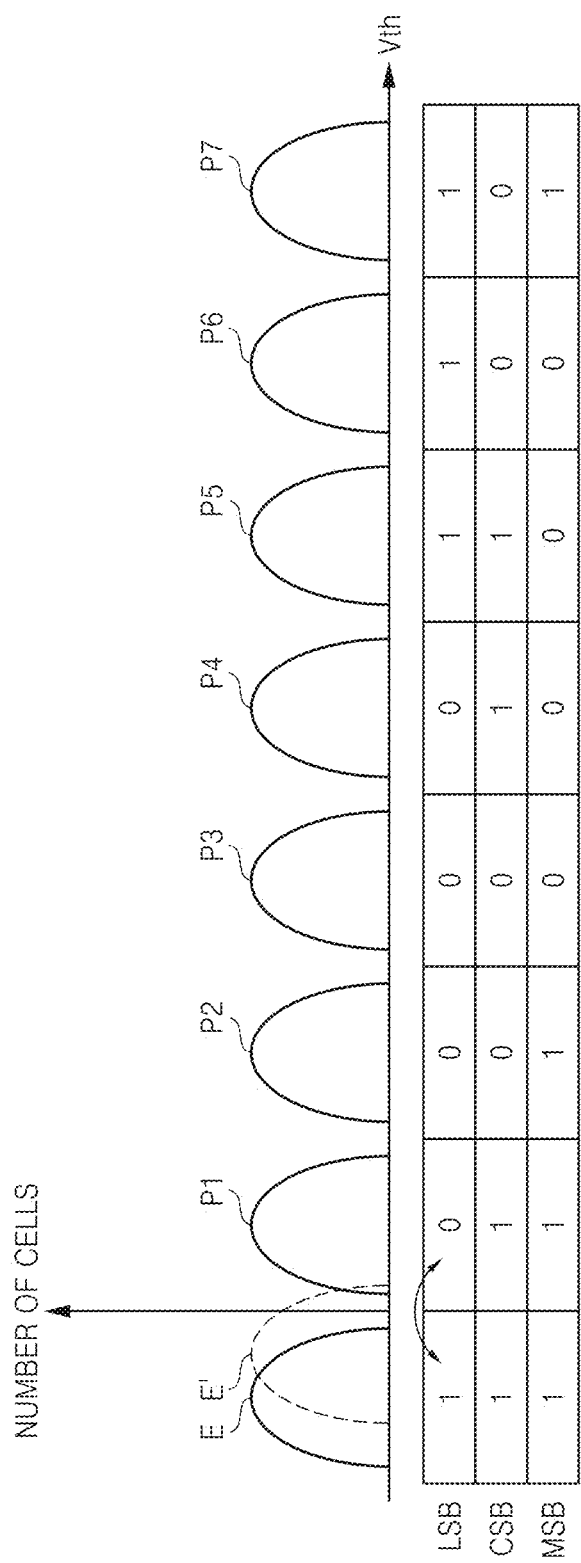

FIG. 7 is another conceptual diagram further describing data reliability expectation differences between various page-groups caused by read disturbance. Referring to FIG. 7, threshold voltage distributions for a 3-bit MLC are shown. Possible states for the 3-bit MLC include an erase state E and seven (7) program states P1, P2, P3, P4, P5, P6 and P7, respectively corresponding to data values '111', '011', '001', '000', '010', '110', '100', and '101'. Here, a first bit of each data value is said to be the LSB, the second bit is a center significant bit (CSB), and the third bit is the MSB.

Similar to FIG. 6, a threshold voltage distribution of the erase state E is more affected by read disturbance than the other states P1 through P7. The erase state E may be worse like an erase state E' due to read disturbance. In this case, the reliability of the LSB distinguished by the erase state E and the first program state P1 may be lower than the reliability of the CSB and that of the MSB.

Thus, the reliabilities of an LSB page, a CSB page, and an MSB page that store the LSB, the CBS, and the MSB, respectively, are different. In other words, an LSB page-group including the MSB page in the multi-level cell of 3 bits may have lower reliability than a CSB page-group including the CSB page and an MSB page-group including the MSB page.

The read refresh table of FIG. 8 has been reference above, and may be used during a copy-back operation controlled by the read refresh control module 178 of FIG. 3. Referring to FIGS. 3, 6, and 8, the read refresh table may include read count number information that may be used to initiate a read refresh operation. However, a given read count number may be variously interpreted in relation to one or more reference read count numbers based on different ranges of P/E cycles executed by the flash memory device 200A.

In this manner certain embodiments of the inventive concept recognize that the overall data reliability of a flash memory device will generally decrease as the number of P/E cycles executed by the flash memory device increases. Hence, reference count numbers (or reference count thresholds) may be differently applied during a comparison of a given read count number according to the number of P/E cycle previously executed by the flash memory device. For example as illustrated in FIG. 8, if a "current number of executed P/E cycles" falls within a first range of between zero and 100, then a given read count number received from the counting module 178-1 will be compared with a first reference count threshold (e.g., RC1-1). In contrast, if a current number of executed P/E cycles falls within a second range of between 101 and 500, then a given read count number will be compared with a second reference count threshold (e.g., RC1-2), and if a current number of executed P/E cycles falls within a third range of between 501 and 3000, then a given read count number will be compared with a third reference count threshold (e.g., RC1-3). In the illustrated example of FIG. 8. it is assumed that the second reference count threshold RC1-2 is less than the first reference count threshold RC1-1, and the third reference count threshold RC1-3 is less than the second reference count threshold RC1-2. Of additional note, the foregoing P/E cycle ranges and first set of reference count thresholds (RC1-1, RC1-2 and RC1-3) are associated in the read refresh table of FIG. 8 with a first page-group (PAGE-GROUP1), whereas a second set of reference count thresholds (RC2-1, RC2-2 and RC2-3) are associated in the read refresh table of FIG. 8 with a second page-group (PAGE-GROUP2). Those skilled in the art will understand that many more reference count thresholds (and corresponding executed P/E cycle ranges) may be used in various embodiments of the inventive concept, and may be variously associated with a great number of defined page-groups.

Thus, even under the same general operating conditions (e.g., a current range of executed P/E cycles), a first reference count threshold associated with a first page-group may be different (or the same) as a second reference count threshold associated with a second page-group. As a result, the granularity (and resulting volume) of the information stored read refresh table of FIG. 8 may be controlled in certain embodiments of the inventive concept by the particular definition of the page-groups within one or more block(s).

According to certain embodiments of the inventive concept, the first page-group of FIG. 8 may be a MSB page-group including MSB pages, while the second page-group may be a LSB page-group including LSB pages. Continuing with the assumptions described above with respect to FIGS. 6 and 7, the first page-group may have lower data reliability expectation than the second page-group. Thus, the first set of reference count thresholds may more strict (i.e., lower) than the second set of reference count thresholds.

According to other embodiments of the inventive concept, a competent read refresh table may include information related to different reference count thresholds (and executed P/E cycle ranges or other memory system condition indicator(s)) for three (3) or more page-groups of data per memory cell (e.g., an MSB page-group; a CSB page-group; and a LSB page-group, where the LSB page-group may have lower data reliability expectation than the MSB page-group and/or the CSB page-group).

Figure 9:
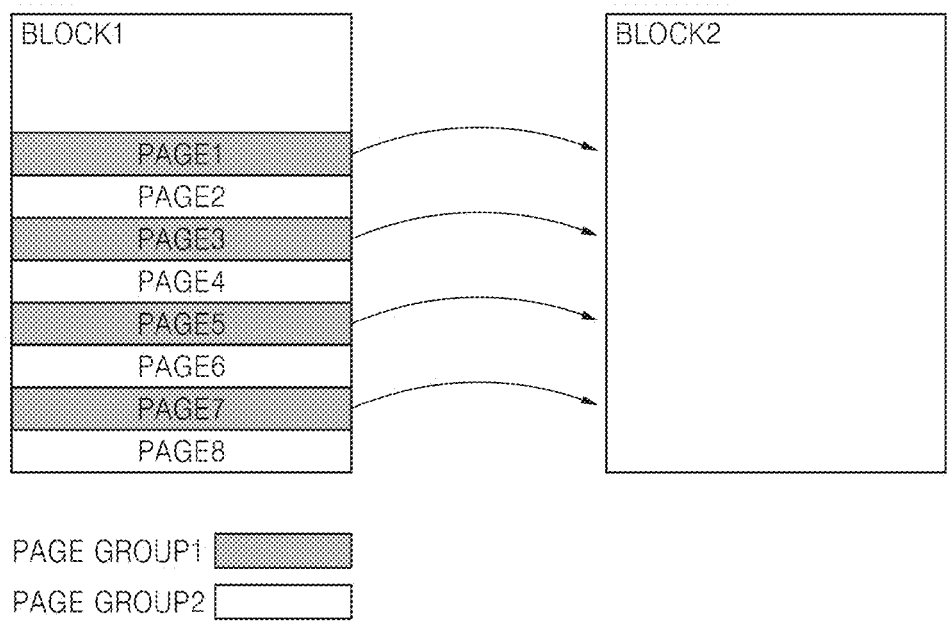
FIG. 9 is a conceptual diagram further illustrating in one example a copy-back operation that may be controlled by the read refresh control module of FIG. 3.

FIG. 9 is a conceptual diagram illustrating a copy-back operation that may be executed under the control of the read refresh control module 178 of FIG. 3. Referring to FIGS. 3 and 9, the flash controller 100A may be used to control the flash memory device 200A to copy-back data stored in a first page-group including PAGE1, PAGE3, PAGE5, and PAGE7. Here, the first page-group data is copied back from an old block (BLOCK1) to a new block (BLOCK2). It is assumed that consistent with the foregoing, the first page-group of FIG. 9 is subjected to the copy-back operation because a current read count number for the first page-group data exceeds a reference count threshold associated with a current number of executed P/E cycles for the flash memory device.

Figure 10:
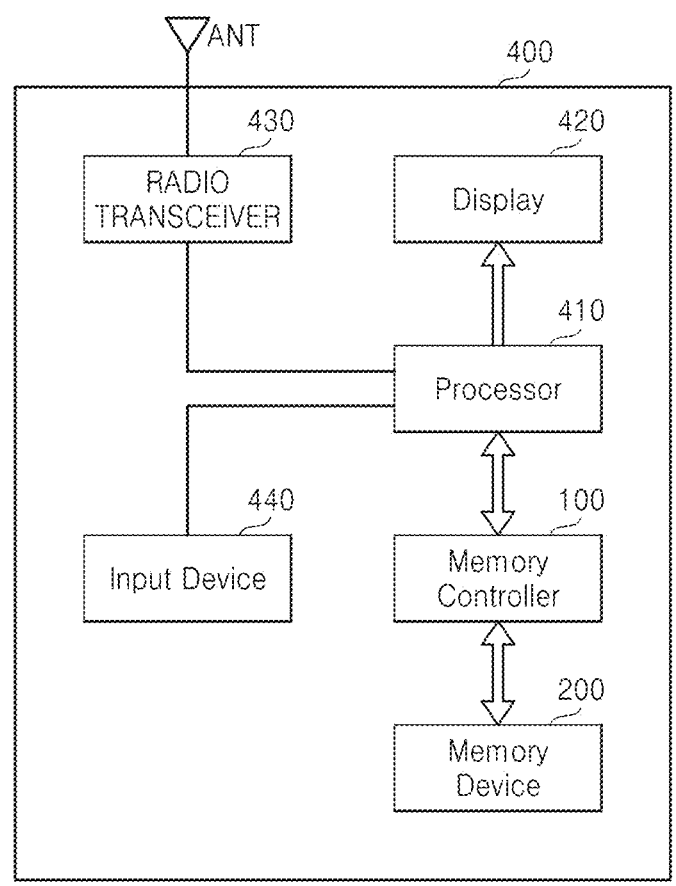
FIGS. 10, 11, 12, 13 and 14 are respective block diagrams of various electronic systems that may be implemented using a memory controller and one or more non-volatile memory device(s) according to certain embodiments of the inventive concept.

FIG. 10 is a block diagram of an electronic system 400 according to another embodiment of the inventive concept, which includes the memory controller 100 and the non-volatile memory device 200 of FIG. 1. Referring to FIGS. 1 and 10, the electronic system 400 may be implemented by using a cellular phone, a smart phone, a personal digital assistant (PDA), mobile internet device (MID), a wearable computer, a wireless communication device, or the like.

The electronic system 400 may include the non-volatile memory device 200, the memory controller 100 capable of controlling an operation of the non-volatile memory device 200, a processor 410, a display 420, a radio transceiver 430, and an input device 440.

The memory controller 100 may control a data access operation of the non-volatile memory device 200, for example, a program operation, an erase operation, or a read operation, under the control of the processor 410. The data programmed in the non-volatile memory device 200 may be displayed via the display 420 under the control of the processor 410 and/or the memory controller 100.

The processor 410 may control an operation of the display 420 so that data output by the memory controller 100, data output by the radio transceiver 430, or data output by the input device 440 may be displayed via the display 420.

The radio transceiver 430 may transmit or receive a radio signal via an antenna ANT. For example, the radio transceiver 430 may transform the radio signal received via the ANT into a signal that can be processed by the processor 410. Thus, the processor 410 may process the signal output by the radio transceiver 430 and may transmit a signal obtained by the processing to the memory controller 100 or the display 420.

The radio transceiver 430 may also change the signal output by the processor 410 to a radio signal and may output the radio signal to an external device via the ANT.

The input device 440 is capable of inputting a control signal for controlling an operation of the processor 410 or data to be processed by the processor 410, and may be implemented by using a pointing device, such as a touch pad or a computer mouse, a keypad, a keyboard, or the like. According to an embodiment, the memory controller 100 capable of controlling the operation of the non-volatile memory device 200 may be implemented by using a part of the processor 410 and may also be implemented by using a special chip separate from the processor 410.

Figure 11:
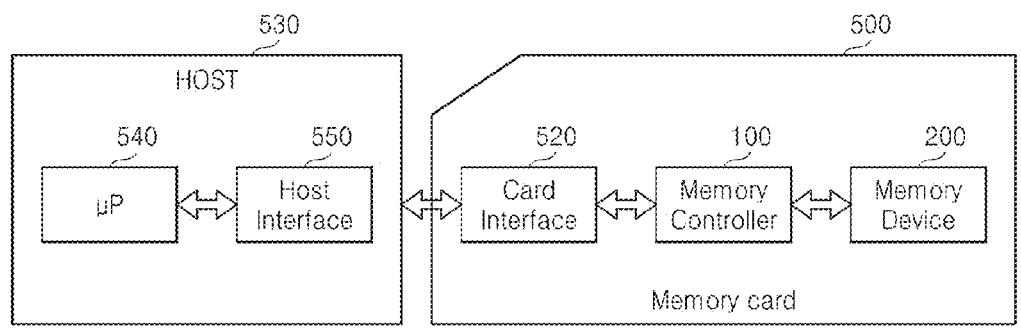

FIG. 11 is a block diagram of an electronic system 500 according to another embodiment of the inventive concept, which includes the memory controller 100 and the non-volatile memory device 200 illustrated in FIG. 1. Referring to FIGS. 1 and 11, the electronic system 500 may be implemented by using a memory card, a smart card, or the like.

The electronic system 500 includes the memory controller 100, the non-volatile memory device 200, and a card interface 520. The memory controller 100 may control data exchange between the non-volatile memory device 200 and the card interface 520.

The card interface 520 may interface data exchange between a host 530 and the memory controller 100 according to a protocol of the host 530. According to an embodiment, the card interface 520 may be a secure digital (SD) card interface or an MMC interface, but is not limited thereto.

According to another embodiment, the card interface 520 may support a USB protocol and an interchip (IC)-USB protocol. Herein, the card interface 520 may denote hardware capable of supporting the protocol used by the host 530, software mounted in the hardware, or a signal transmission method.

The host 530 may be implemented by using a PC, a tablet PC, a digital camera, a digital audio player, a mobile telephone, console video game hardware, a digital set-top box, or the like.

When the electronic system 500 contacts a host interface 550 of the host 530, the host interface 550 may perform data communication with the non-volatile memory device 200 via the card interface 520 and the memory controller 100 under the control of a microprocessor 540.

Figure 12:
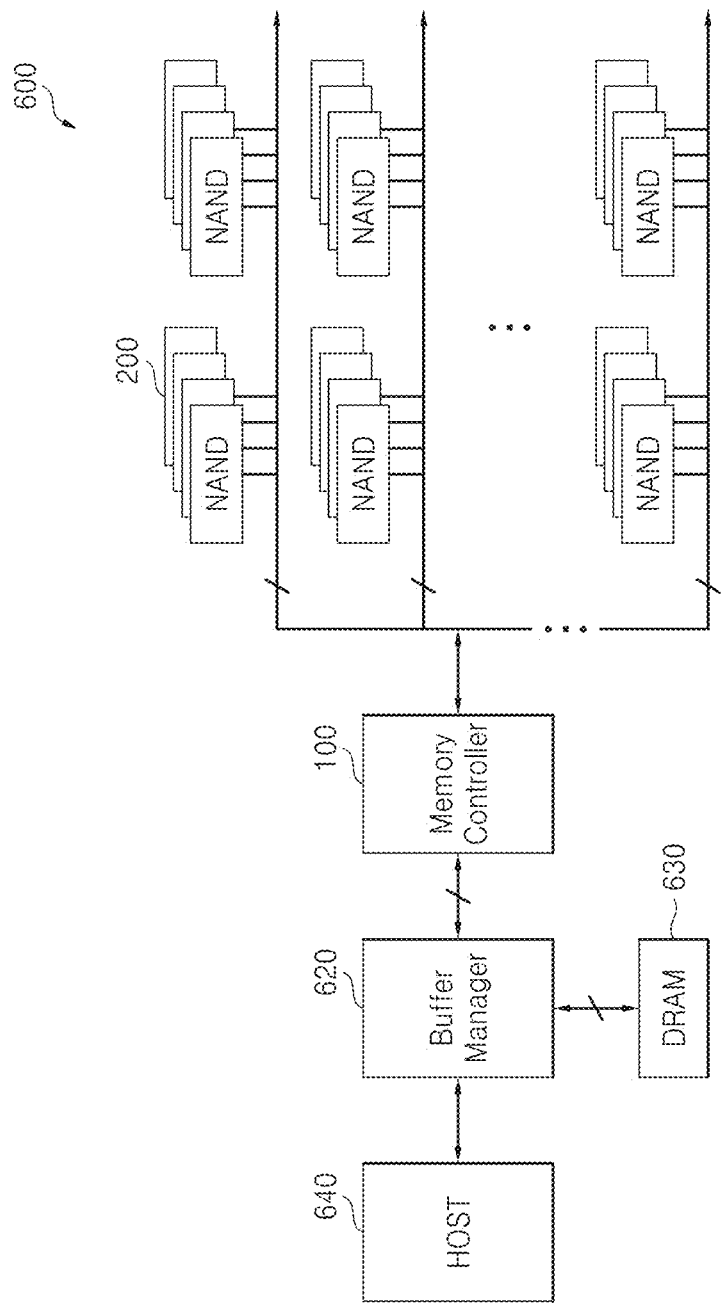

FIG. 12 is a block diagram of an electronic system 600 according to another embodiment of the inventive concept, which includes the memory controller 100 and the non-volatile memory device 200 illustrated in FIG. 1. Referring to FIGS. 1 and 12, the electronic system 600 may be implemented by using an SSD.

The electronic system 600 may include the memory controller 100, a plurality of non-volatile memory devices 200, a buffer manager 620, a volatile memory device 630, and a host 640. The memory controller 100 may control a data processing operation of each of the non-volatile memory devices 200.

The buffer manager 620 may control the volatile memory device 630 to store data that is exchanged between the memory controller 100 and the host 640. The volatile memory device 630 may buffer the data exchanged between the memory controller 100 and the host 640. According to an embodiment, the volatile memory device 630 may be implemented by using a DRAM.

Figure 13:
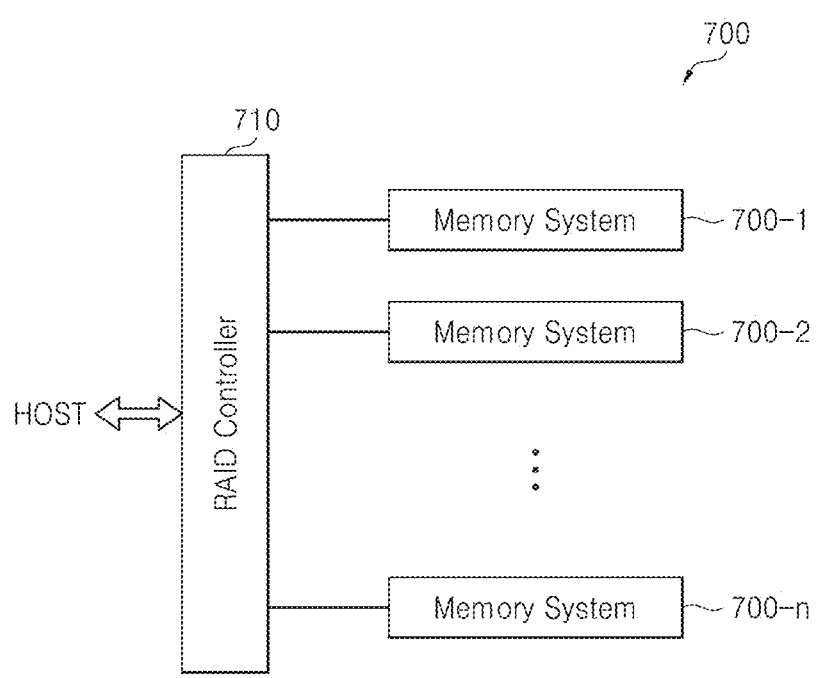

FIG. 13 is a block diagram of an electronic system 700 according to another embodiment of the inventive concept, which includes the memory system 20 illustrated in FIG. 1. Referring to FIGS. 1 and 13, the electronic system 700 may be implemented by using a redundant array of independent disks (RAID) system and may include a RAID controller 710 and a plurality of memory systems 700-1 through 700-$n$ (where n is a natural number).

Each of the memory systems 700-1 through 700-$n$ may be the memory system 20 illustrated in FIG. 1. The memory systems 700-1 through 700-$n$ may constitute a RAID array. According to an embodiment, electronic system 700 may be implemented by using a PC or an SSD.

While a program operation is being performed, the RAID controller 710 may transmit program data output by a host according to a program command output by the host, to at least one of the memory systems 700-1 thorough 700-$n$ according to a RAID level.

While a read operation is being performed, the RAID controller 710 may transmit, to the host, data red from at least one of the memory systems 700-1 thorough 700-$n$ according to a read command output by the host.

The host of FIG. 13 may denote the host 10 of FIG. 1.

Figure 14:
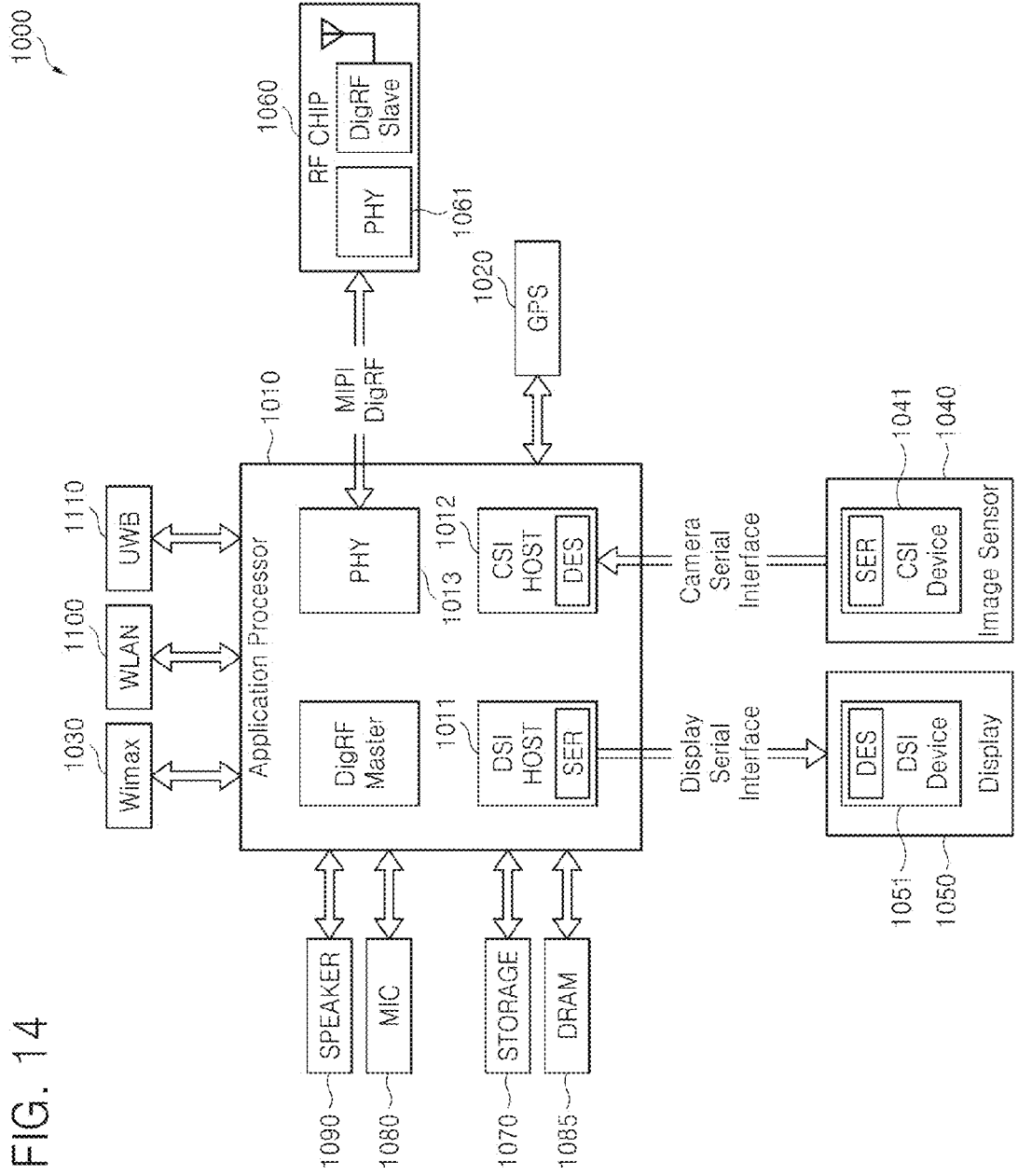

FIG. 14 is a block diagram of an electronic system 1000 according to another embodiment of the inventive concept. Referring to FIGS. 1 and 14, the electronic system 1 of FIG. 1 may be implemented by using the electronic system 1000 of FIG. 14. The electronic system 1000 may be implemented by using a data processing device capable of using or supporting a mobile industry processor interface (MIPI). Examples of the data processing device include a PDA, a portable multimedia player (PMP), an internet protocol television (IPTV), and a smart phone.

A camera serial interface (CSI) host 1012 implemented in an application processor 1010 may serially communicate with a CSI device 1041 of an image sensor 1040 via a CSI. For example, the CSI host 1012 may include a deserializer (DES), and the CSI device 1041 may include a serializer (SER).

A display serial interface (DSI) host 1011 implemented in the application processor 1010 may serially communicate with a DSI device 1051 of a display 1050 via a DSI. For example, the DSI host 1011 may include an SER, and the DSI device 1051 may include a DES.

According to an embodiment, the electronic system 1000 may further include a RF chip 1060 capable of communicating with the application processor 1010. A PHYsical layer (PHY) 1013 included in the application processor 1010 and a PHY 1061 included in the RF chip 1060 may exchange data with each other according to a MIPI digRF.

According to an embodiment, the electronic system 1000 may further include a global positioning system (GPS) receiver 1020, a storage 1070, a microphone (MIC) 1080, a DRAM 1085, and a speaker 1090.

The host 10 of FIG. 1 may be implemented by using the application processor 1010 of FIG. 14, and the memory system 20 of FIG. 1 may be implemented by using the storage 1070 of FIG. 14.

The electronic system 1000 may communicate by using a world interoperability for microwave access (WIMAX) module 1030, a wireless local area network (WLAN) module 1100, and/or an ultra wideband (UWB) module 1110.

Various memory controller operating methods, memory controllers and apparatuses incorporating same according to embodiments of the inventive concept will be capable of executing a read refresh operation on a page-group by page-group basis. Thus, page-group data having understood characteristics (i.e., a number of read operation directed thereto) in the context of current flash memory device characteristics (i.e., a current number of executed P/E cycles) may be appropriately managed in memory to ensure acceptable data reliability expectations, thereby improving over reliability and performance of the memory system.

While the inventive concept has been particularly shown and described with reference to exemplary embodiments thereof, it will be understood that various changes in form and details may be made therein without departing from the scope of the following claims.

What is claimed is:

1. A method of operating a memory controller that controls a memory device, the method comprising:
    counting a first number of read operations directed to a first page-group of data stored in a first block of the memory device to generate a first read count number, and counting a second number of read operations directed to a second page-group of data stored in the first block of the memory device to generate a second read count number;
    comparing the first read count number with a first reference count threshold among a first set of reference count thresholds, and comparing the second read count number with a second reference count threshold among a second set of reference count thresholds;
    upon determining that the first read count number exceeds the first reference count threshold, performing a copy-back operation of the first page-group data from the first block to a second block of the memory device different from the first block; and
    upon determining that the second read count number exceeds the second reference count threshold, performing the copy-back operation of the second page-group data from the first block to a third block of the memory device different from the first block,
    wherein each one of the reference count thresholds in the first set of reference count thresholds is respectively associated with the first page-group and a range of executed program and/or erase (P/E) cycles for the memory device,
    each one of the reference count thresholds in the second set of reference count thresholds is respectively associated with the second page-group and a range of executed P/E cycles for the memory device, and
    the first page-group data has a lower data reliability expectation than the second page-group data due to read disturbance.

2. The method of claim 1, wherein the second reference count threshold is different from any reference count threshold in the first set of reference count thresholds.

3. The method of claim 1 wherein the memory device comprises two bit, multi-level memory cells (2-bit MLC), and
    the first page-group data is Most Significant Bit (MSB) data and the second page-group data is Least Significant Bit (LSB) data respectively stored in the 2-bit MLC.

4. The method of claim 3, wherein the first page-group data has a lower data reliability expectation than the second page-group data due to read disturbance.

5. The method of claim 3, wherein each reference count threshold in the first set of reference count thresholds is respectively lower than a corresponding reference count threshold in the second set of reference count thresholds for each range of executed P/E cycles.

6. The method of claim 5, wherein each range of executed P/E cycles is defined in a set of ranges of executed P/E cycles, and
    each reference count threshold in the first set of reference count thresholds sequentially decreases with each sequential increase in the range of executed P/E cycles.

7. The method of claim 6, wherein each reference count threshold in the second set of reference count thresholds sequentially decreases with each sequential increase in the range of executed P/E cycles.

8. The method of claim 1, wherein the memory device is a flash memory device.

9. The method of claim 1, further comprising:
    comparing the third read count number with a third reference count threshold among a third set of reference count thresholds associated with the third page-group; and
    upon determining that the third read count number exceeds the third reference count threshold, performing the copy-back operation of the third page-group data from the first block to a fourth block of the memory device different from the first block, wherein each one of the reference count thresholds in the third set of reference count thresholds is respectively associated with a range of executed P/E cycles for the memory device.

10. The method of claim 9, wherein the third reference count threshold is different from any reference count threshold in the first and second sets of reference count thresholds.

11. The method of claim 9, wherein the memory device comprises three bit, multi-level memory cells (3-bit MLC), and the first page-group data is Most Significant Bit (MSB) data, the second page-group data is Least Significant Bit (LSB) data, and the third page-group data is Center Significant Bit (CSB) data respectively stored in the 3-bit MLC.

12. A memory controller for controlling a memory device and comprising:

a counting module that generates a first read count number for a first page-group of data stored in a first block of a flash memory device, and a second count number for a second page-group of data stored in the first block of the memory device to generate a second read count number; and a copy-back page-group determination module that compares the first read count number with a first reference count threshold among a first set of reference count thresholds, compares the second read count number with a second reference count threshold among a second set of reference count thresholds, upon determining that the first read count number exceeds the first reference count threshold, performs a copy-back operation of the first page-group data from the first block to a second block of the flash memory device different from the first block, and upon determining that the second read count number exceeds the second reference count threshold, performing the copy-back operation of the second page-group data from the first block to a third block of the memory device different from the first block, wherein each one of the reference count thresholds in the first set of reference count thresholds is respectively associated with the first page-group and a range of executed program and/or erase (P/E) cycles for the memory device, each one of the reference count thresholds in the second set of reference count thresholds is respectively associated with the second page-group and a range of executed P/E cycles for the memory device, and the first page-group data has a lower data reliability expectation than the second page-group data due to read disturbance.

13. The memory controller of claim 12, wherein the second reference count threshold is different from any reference count threshold in the first set of reference count thresholds.

14. The memory controller of claim 12, wherein the memory device comprises two bit, multi-level memory cells (2-bit MLC), the first page-group data is Most Significant Bit (MSB) data and the second page-group data is Least Significant Bit (LSB) data respectively stored in the 2-bit MLC.

15. The memory controller of claim 14, wherein each reference count threshold in the first set of reference count thresholds is respectively lower than a corresponding reference count threshold in the second set of reference count thresholds for each range of executed P/E cycles.

16. The memory controller of claim 15, wherein each range of executed P/E cycles is defined in a set of ranges of executed P/E cycles, each reference count threshold in the first set of reference count thresholds sequentially decreases with each sequential increase in the range of executed P/E cycles, and each reference count threshold in the second set of reference count thresholds sequentially decreases with each sequential increase in the range of executed P/E cycles.

* * * * *